Patented Dec. 3, 1929

1,738,081

UNITED STATES PATENT OFFICE

STANLEY COCHRAN SMITH, OF LONDON, ENGLAND, ASSIGNOR OF ONE-HALF TO CHEMICAL & METALLURGICAL CORPORATION LIMITED, OF LONDON WALL, ENGLAND

CONVERSION OF LEAD SULFATE AND LEAD CHLORIDE INTO LEAD CARBONATE

No Drawing. Application filed June 13, 1927, Serial No. 198,698, and in Great Britain June 29, 1926.

Application for U. S. Patent Serial No. 22,485 describes a process which consists in suspending lead sulfate in solution of ammonia and passing carbon dioxide into the suspension, whereby the lead sulfate is converted into lead carbonate.

I have found that in order to obtain most easily in this process a lead carbonate containing the minimum proportion of lead sulfate the operation should be conducted in such a manner that the carbon dioxide is fixed in the form of lead carbonate as nearly as possible simultaneously with its introduction into the suspension.

This object may be attained by passing the carbon dioxide into the suspension at a rate which is not appreciably greater than the rate of absorption of the carbon dioxide by the lead compounds present; in other words, at such a rate that the presence of carbon dioxide in the liquid is avoided as far as possible.

For example 556 lbs. of a solution of ammonia of 21 per cent strength, 250 lbs. of water and 1000 lbs. of lead sulfate were agitated at ordinary temperature for ½ hour in an autoclave. $CO_2$ was then led in at the maximum rate possible without causing the concentration of carbon dioxide in the liquor to rise above 0.3 per cent the liquor being tested from time to time during the progress of the carbonation. The temperature of the liquor rose to about 80° C. and the pressure in the autoclave to about 30 lbs. per sq. inch both of these being the maximum readings. After 4 hours carbonation under the above conditions, analysis of a sample showed the conversion to be complete. The solid was then removed from the liquor by filtration and the lead carbonate residue washed with water, when it was found to contain less than 0.1 per cent of sulfate.

The basic principles of the process may also be applied to the conversion of lead chloride into lead carbonate, as described in my copending application Serial No. 198,699, filed June 13, 1927, from which application the following description is taken:

My U. S. Patent No. 1,643,261, dated Sept. 20, 1927, describes a process for converting lead chloride into lead carbonate, and its application to the winning of lead from ores, residues and the like; the process consists in suspending lead chloride, which may be that obtained by known methods of extraction of lead as chloride from ores, concentrates, residues and the like, in a solution of ammonia and passing carbon dioxide into the suspension, whereby the lead chloride is converted into lead carbonate.

I have found that in order to obtain most easily in this process a lead carbonate containing the minimum proportion of lead chloride the operation should be conducted in such a manner that the carbon dioxide converts the lead chloride into lead carbonate as nearly as possible simultaneously with its introduction into the suspension.

This object may be attained by passing the carbon dioxide into the suspension at a rate which is not appreciably greater than the rate of absorption of the carbon dioxide by the lead compounds present; in other words, at such a rate that the presence of carbon dioxide in the liquor is avoided as far as possible.

For example, 606 lbs. of a solution of ammonia of 20.8 per cent strength, 284 lbs. of water and 1000 lbs. of lead chloride were agitated at ordinary temperature for ½ hour in an autoclave. $CO_2$ was then led in at the maximum rate possible without causing the concentration of carbon dioxide in the liquor to rise above 0.3% the liquor being tested from time to time during the progress of the carbonation. The temperature of the liquor rose to about 80° C. and the pressure in the autoclave to about 30 lbs. per square inch, both of these being the maximum recordings. After 4 hours carbonation under the above conditions, analysis of a sample showed the conversion to be complete. The solid was then removed from the liquor by filtration and the lead carbonate residue washed with water, when it was found to contain less than 0.1 per cent of chloride.

Having thus described the nature of the said invention and the best means I know of carrying the same into practical effect, I claim:—

1. In the manufacture of lead carbonate by passing carbon dioxide into a suspension of lead sulfate in a solution of ammonia, the improvement which consists in operating in such a manner that the carbon dioxide is fixed in the form of lead carbonate as nearly as possible simultaneously with its introduction into the suspension.

2. A manufacture of lead carbonate by suspending lead sulfate in a solution of ammonia and passing carbon dioxide into the suspension at such a rate that the presence in the solution of carbon dioxide determinable by analysis is avoided as far as possible.

3. A manufacture of lead carbonate by suspending lead sulfate in a solution of ammonia and passing carbon dioxide into the suspension at such a rate that the concentration of carbon dioxide determinable by analysis is not substantially higher than 0.3 per cent.

4. In the manufacture of lead carbonate by passing carbon dioxide into a suspension of a lead salt selected from the group consisting of lead sulfate and lead chloride in a solution of ammonia, the improvement which consists in operating in such a manner that the carbon dioxide is fixed in the form of lead carbonate as nearly as possible simultaneously with its introduction into the suspension.

5. A manufacture of lead carbonate by suspending a lead salt selected from the group consisting of lead sulfate and lead chloride in a solution of ammonia, and passing carbon dioxide into the suspension at such a rate that the presence in the solution of carbon dioxide determinable by analysis is avoided as far as possible.

6. A manufacture of lead carbonate by suspending a lead salt selected from the group consisting of lead sulfate and lead chloride in a solution of ammonia, and passing carbon dioxide into the suspension at such a rate that the concentration of carbon dioxide determinable by analysis is not substantially higher than 0.3 per cent.

In testimony whereof I have signed my name to this specification.

STANLEY COCHRAN SMITH.